(12) United States Patent
Lei

(10) Patent No.: US 7,586,699 B2  
(45) Date of Patent: Sep. 8, 2009

(54) LENS MODULE WITH FOCUSING FUNCTION

(75) Inventor: Bin Lei, Foshan (CN)

(73) Assignees: Premier Image Technology(China) Ltd., Forshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 53 days.

(21) Appl. No.: 11/925,327

(22) Filed: Oct. 26, 2007

(65) Prior Publication Data

US 2008/0316625 A1 Dec. 25, 2008

(30) Foreign Application Priority Data

Jun. 22, 2007 (CN) .................. 2007 1 0200864

(51) Int. Cl.  
*G02B 7/02* (2006.01)

(52) U.S. Cl. .................. 359/822; 359/819; 359/824

(58) Field of Classification Search ......... 359/819–824; 396/132, 323  
See application file for complete search history.

(56) References Cited

U.S. PATENT DOCUMENTS

| 4,536,071 A | * | 8/1985 | Maekawa et al. ........... 396/132 |
| 4,802,738 A | * | 2/1989 | Ando et al. ................. 359/827 |
| 4,873,542 A | | 10/1989 | Nakayama .................. 396/114 |
| 5,150,260 A | | 9/1992 | Chigira |

* cited by examiner

*Primary Examiner*—Mohammed Hasan  
(74) *Attorney, Agent, or Firm*—Zhigang Ma

(57) ABSTRACT

An exemplary lens module with focusing function includes a lens group, a lead screw, a transmission member, an actuator, and two stop portions. The lens group is slidable along the optical axis thereof. The lead screw is set so that the longitudinal direction thereof is essentially parallel to the optical axis. The transmission member is secured to the lens group, and includes a deformable screw-engaging portion. The deformable screw-engaging portion is disengageably engaged with the lead screw. The actuator is configured for driving the lead screw to rotate to force the transmission member to move along the lead screw. The two stop portions are configured for delimiting a movable boundary of the transmission member along the lead screw. The surrounding portion will disengage from the lead screw when the surrounding portion abuts against the stop portion and the lead screw continues rotating.

20 Claims, 5 Drawing Sheets

(12)  United States Patent

LENS MODULE WITH FOCUSING FUNCTION

BACKGROUND

1. Technical Field

The invention relates to imaging technology and, particularly, relates to a lens module with focusing function.

2. Description of Related Art

Lens modules commonly employ a focusing/zooming function for adjusting an image plane thereof to produce a high quality image. A typical focusing/zooming lens module includes a lens barrel, a lens group, a lead screw, a transmission nut, a motor, and two stop portions. The lens group is slidably received in the lens barrel. The lead screw is set so that the longitudinal direction thereof is parallel to the optical axis of the lens group. The transmission nut is meshed with the lead screw, and is connected to the lens group. The motor is configured for driving the lead screw to rotate to force the transmission nut to move, with the lens group, along the lead screw to a focused/zoomed position. The two stop portions are configured for delimiting a movable boundary of the transmission nut (the focusing/zooming range of the focusing/zooming lens module).

In such focusing/zooming lens modules, an over-rotation of the lead screw (the lead screw continues rotating until the transmission nut abuts against the stop portion) caused by misoperations of users or control errors of the motor may cause the lead screw to engage with the transmission nut, and then cannot be disengaged. And so, the focusing/zooming lens module loses the focusing/zooming function.

Therefore, it is desirable to provide a lens module with focusing function, which can overcome the abovementioned problem.

SUMMARY

In a present embodiment, a lens module with focusing function includes a lens group, a lead screw, a transmission member, an actuator, and two stop portions. The lens group is slidable along the optical axis thereof. The lead screw is set so that the longitudinal direction thereof is parallel to the optical axis. The transmission member is secured to the lens group, and includes a deformable screw-engaging portion. The deformable screw-engaging portion is disengageably engaged with the lead screw. The actuator is configured for driving the lead screw to rotate to force the transmission member to move along the lead screw. The two stop portions are configured for delimiting a movable boundary of the transmission member along the lead screw. The deformable screw-engaging portion disengages from the lead screw when the screw-engaging portion abuts against the stop portion and the lead screw continues rotating.

BRIEF DESCRIPTION OF THE DRAWINGS

Many aspects of the present lens module should be better understood with reference to the following drawings. The components in the drawings are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF THE EMBODIMENTS

Embodiments of the present lens module will now be described in detail with the references to the drawings.

Figure 1:
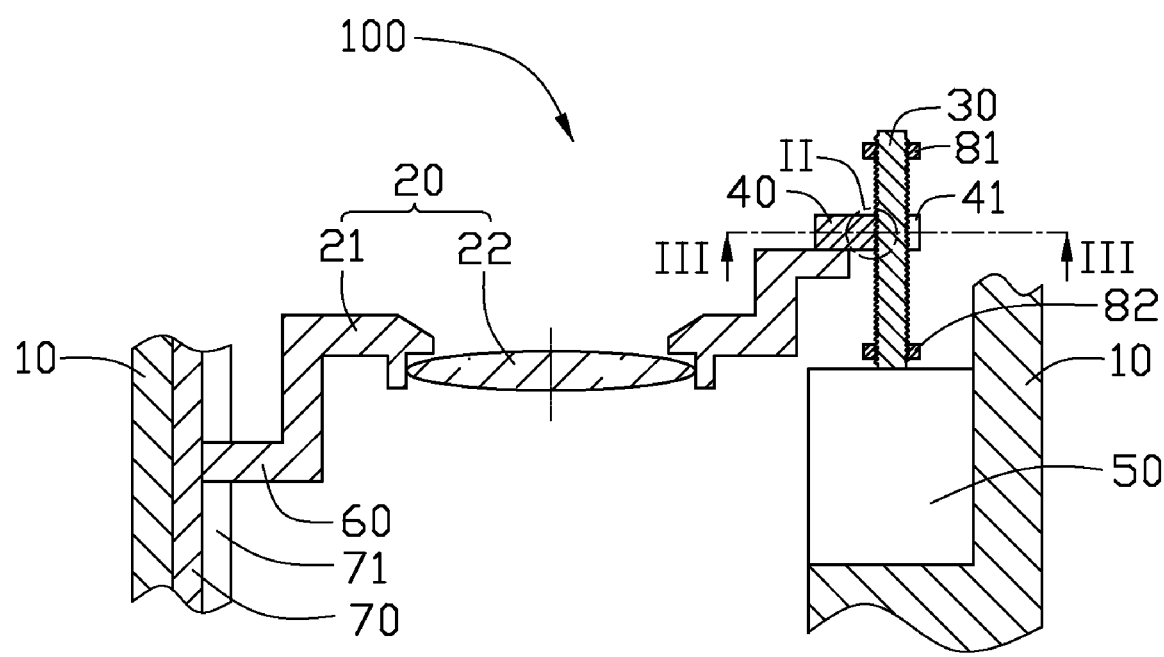
FIG. 1 is a schematic, cross-sectional view of a lens module with focusing function, according to a first embodiment.

Referring to FIG. 1, a lens module 100 with focusing function, according to a first embodiment, includes a lens barrel 10, and a lens group 20, a lead screw 30, a transmission member 40, an actuator 50, a slidable member 60, a guide 70, and two stop portions 81, 82 all received in the lens barrel 10. The lens group 20 is accommodated in the lens barrel 10 so that the optical axis thereof is essentially parallel to the longitudinal direction of the lens barrel 10. The lead screw 30 is set so that the longitudinal direction thereof is essentially parallel to the optical axis. The transmission member 40 is secured to the lens group 20, and includes a deformable surrounding portion 41 partially surrounding the lead screw 30. The surrounding portion 41 is engaged with the lead screw 30. In other words, the surrounding portion 41 (or named as "screw-engaging portion") is a transmission nut meshed with the lead screw 30. The transmission nut defines a longitudinal gap therein (i.e., partially surrounding the lead screw 30) and is connected to the lens group 20. The actuator 50, e.g., motor, is configured for driving the lead screw 30 to rotate. The slidable member 60 is secured to the lens group 20. The guide 70 is configured for guiding the slidable member 60 as it slides along the guiding direction thereof. In particular, the guide 70 defines a guiding groove 71 with the guiding direction essentially parallel to the optical axis, and the slidable member 60 is a fin/arm fitting into the guiding groove 71 and is slidable along the guiding groove 71. Thus, the lens group 20 is capable of irrotationally sliding along the optical axis, and the transmission member 40 can be forced to move along the lead screw 30 without rotation about the lead screw 30. Opportunely, the guide 70 can be integrally formed with the lens barrel 10, namely, the guiding groove 71 is directly defined in the inner surface of the lens barrel 10. The two stop portions 81, 82 e.g., two nuts fixed to the lead screw 30, are configured for delimiting a movable boundary of the transmission member 40 along the lead screw 30. The surrounding portion 41 thus structured will disengage from the lead screw 30 when it abuts against the stop portion 81/82, and the lead screw 30 continues rotating.

The lens group 20 includes a barrel-shaped holder 21 and a pickup lens 22. The pickup lens 22 is held/received in the holder 21. The transmission member 40 and the slidable member 60 are secured to the holder 21. Understandably, the transmission member 40 and/or the slidable member 60 can be integrally formed with the holder 21. In this embodiment, the transmission member 40 is secured to the holder 21 using adhesive, and the slidable member 60 is integrally formed with the holder 21. Alternatively, the lens group 20 could employ more pickup lenses, aperture stop and/or other optical components concentrically held within the holder 21 to assure a high quality of imaging thereof.

It should be understood that the lead screw 30 and the transmission member 40 are configured for, cooperating together, (1) transmitting a rotation motion of the actuator 50 into a linear motion of the lens group 20 to move the lens group 20 to a desirable focusing/zooming position; and (2) enabling the lead screw 30 idling with respect to the surrounding portion 41, in the case that misoperations or control error occur and cause the lead screw 30 to over rotate, to avoid over-tight engagement between the lead screw 30 and the surrounding portion 41. Therefore, high power-transmission efficiency and disengageability between the surrounding portion 41 and the lead screw 30 is desirable.

Figure 2:
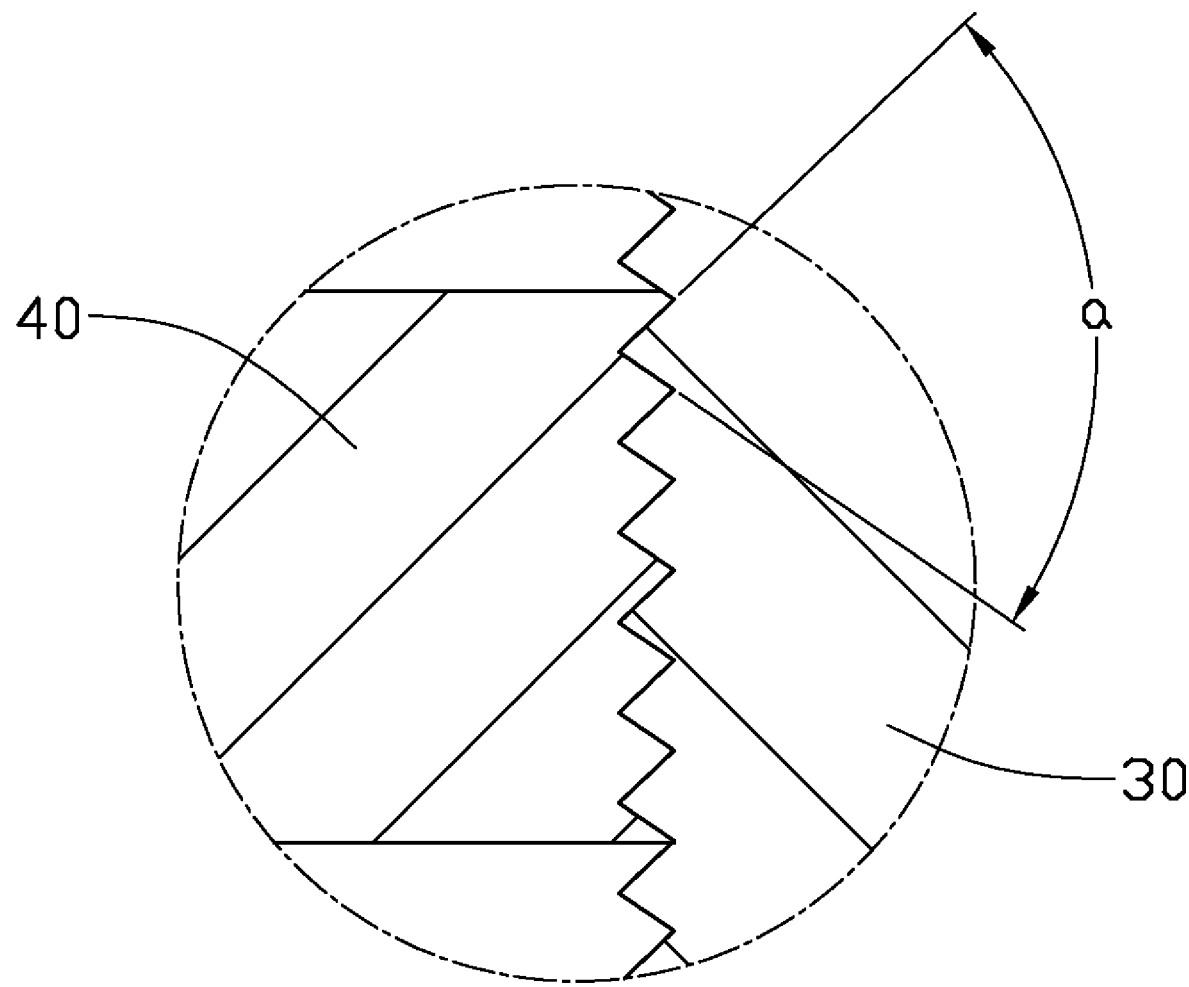
FIG. 2 is an enlarged, sectional view of a portion II of FIG. 1.

Referring to FIG. 2, in order to achieve the high power-transmission efficiency, the lead screw 30 and the surrounding portion 41 are engaged with each other using multiple threads, a large thread angle α of the multiple threads is preferable (the larger the thread angle α is, the higher power-transmission efficiency is), and a large radian (>120°) of the surrounding portion 41 is preferable. On the other hand, in order to get disengageability, the surrounding portion 41 is made of deformable material such as resilient plastic (e.g., polyoxymethylene) or resilient metal (e.g., elastic steel), and a small thread α of the multiple threads is preferable (the smaller the thread angle is, the smaller the engaging force of the multiple threads is, and the surrounding portion 41 is more likely tend to disengage from the lead screw 30 in the small thread angle α case). To balance these two facors, the thread angle α is preferably in an approximate range of 45°~60°.

Figure 3:
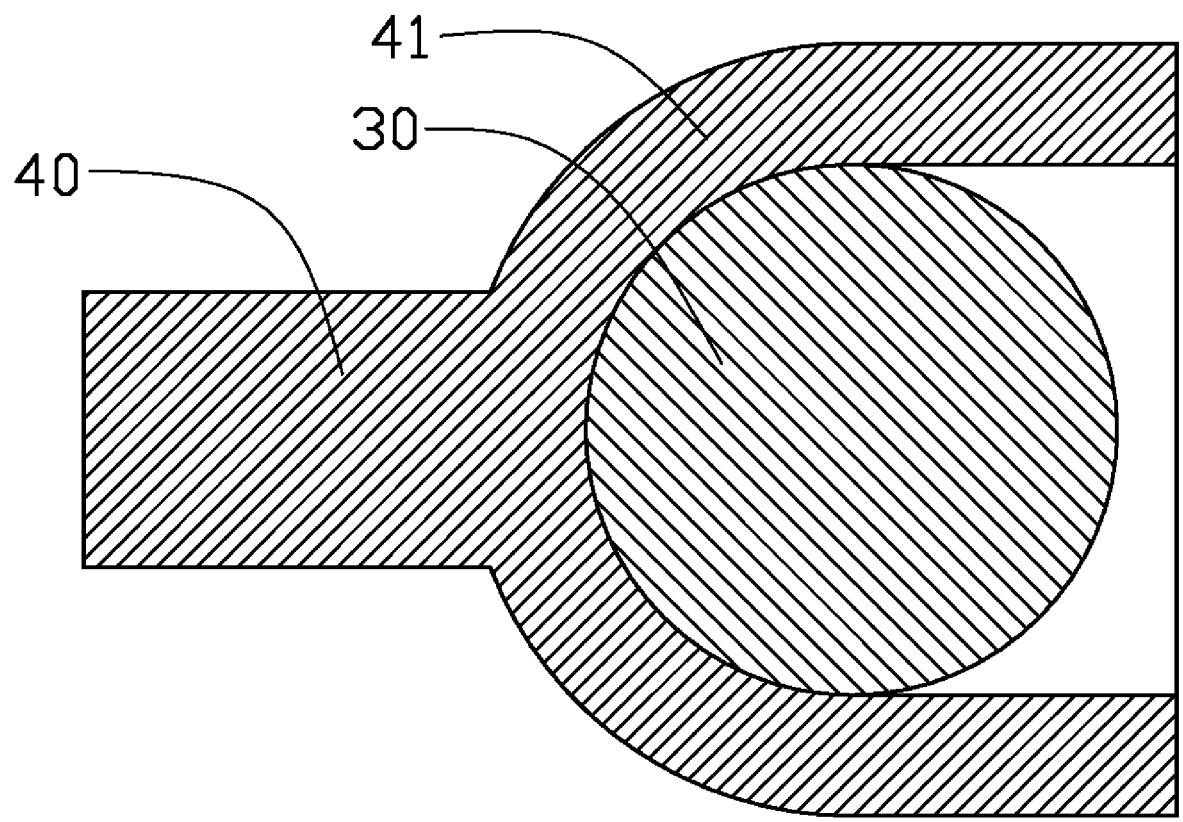
FIG. 3 is a cross-sectional view taken along line III-III of FIG. 1.

Also referring to FIG. 3, in this embodiment, the thread angle α is about 55°, the surrounding portion 41 partially surrounds the lead screw 30 on three sides, and is made of polyoxymethylene, because polyoxymethylene has other advantages: adequate stiffness (for carrying the lens group 20 moving along the lead screw 30), excellent self-lubricity (for decreasing rotation friction force between the surrounding portion 41 and the lead screw 30), excellent formability, and low cost.

The actuator 50 can be a servomotor or a step motor, and is electrically connected to, and is controlled by a control circuit (not shown). The lead screw 30 is coupled to, e.g., directly fixed to or gear engaged with, a rotor of the actuator 50.

The surrounding portion 41 can be forced to disengage from the lead screw 30 when the surrounding portion 41 abuts against the stop portion 81/82 and the lead screw 30 still rotates. Thus, tight engagement between the surrounding portion/transmission nut 41 and the lead screw 30 is avoided. Understandably, if tight engagement of the lead screw 30 is prevented, the lead screw 30 can be driven to reversely rotate to force the transmission member 40 to move, along with the lens group 20, in a reverse direction. Namely, focusing/zooming function of the lens module is protected from the ill effects of over rotation of the lead screw 30.

Figure 4:
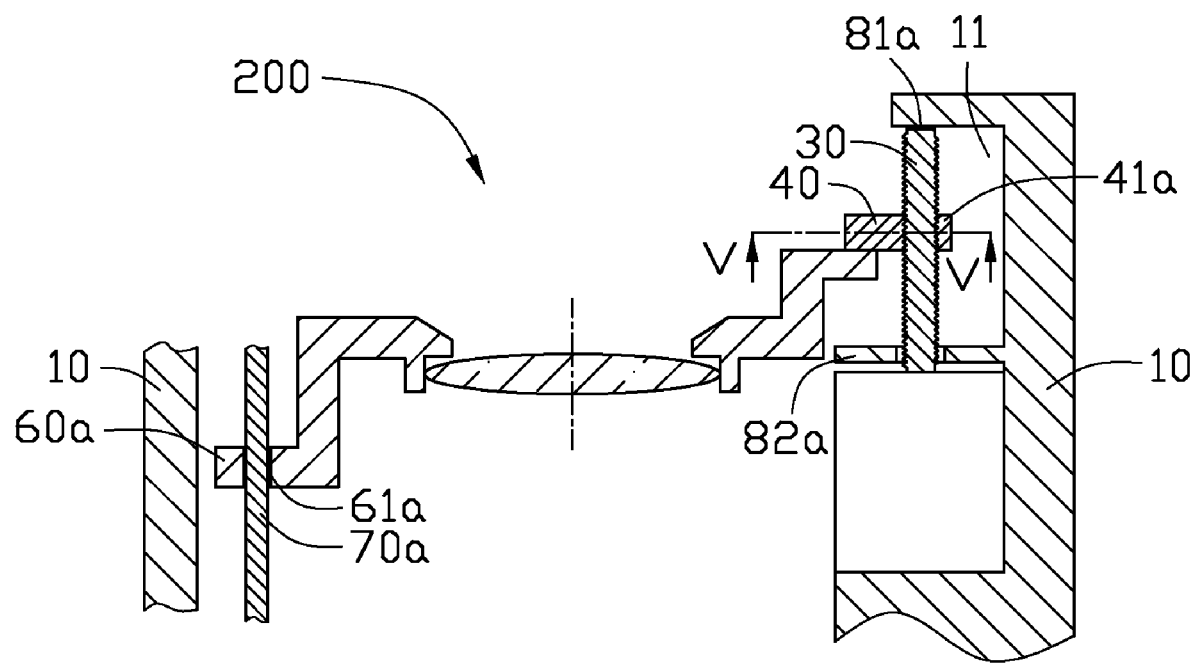
FIG. 4 is a schematic, cross-sectional view of a lens module with focusing function, according to a second embodiment.

Referring to FIG. 4, a lens module 200 with focusing function, according to a second embodiment, is essentially similar to the lens module 100 except with respect to the surrounding portion 41a, the slidable member 60a, the guide 70a, and the stop portions 81a, 82a.

Figure 5:
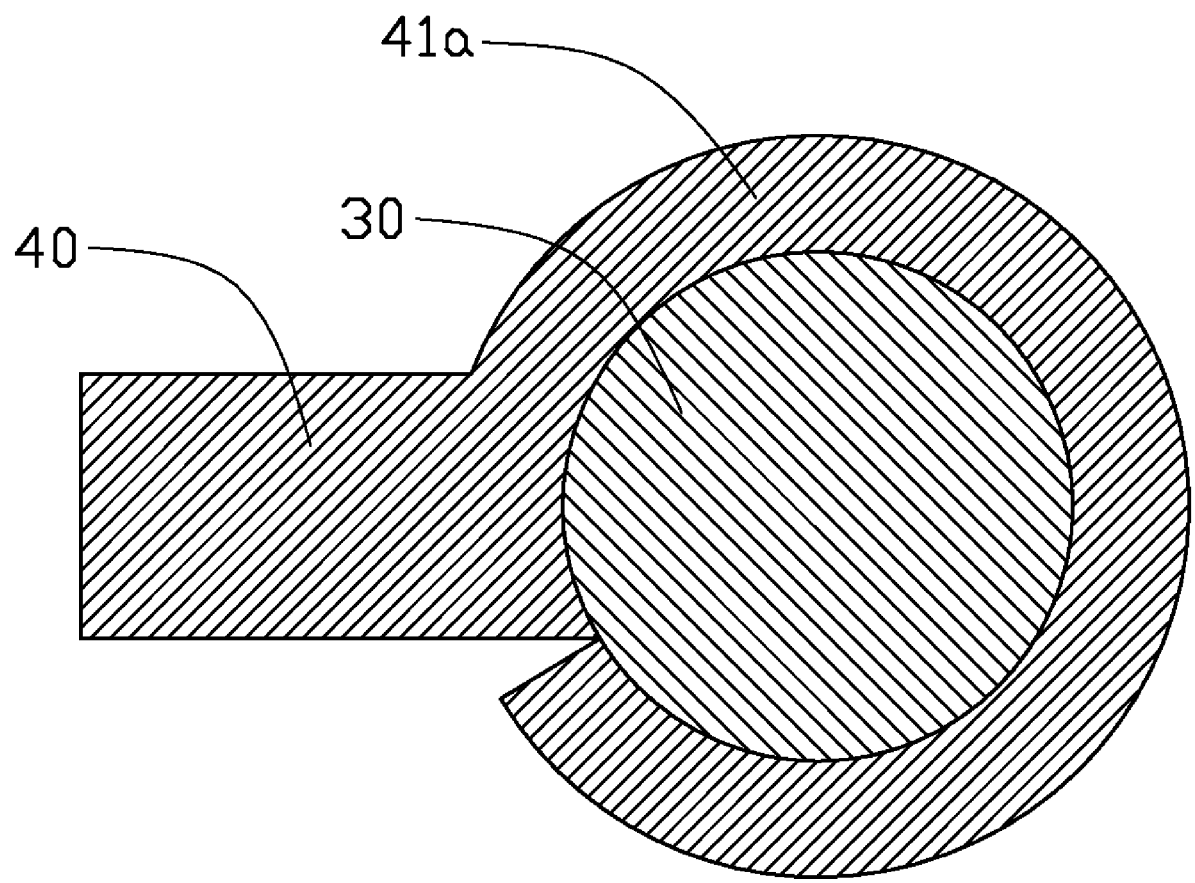
FIG. 5 is a cross-sectional view taken along line V-V of FIG. 4.

Also referring to FIG. 5, the surrounding portion 41a almost, but not quite, completely surrounds the lead screw 30 to provide a higher meshing force for forcing the transmission member 40 to move.

The slidable member 60a defines a through hole 61a. The guide 70a is a guiding rod. The guiding rod is set parallel to the optical axis, and is matingly inserted through the through hole 61a, thus the slidable member 60a is capable of sliding along the guiding rod.

The lens barrel 10 defines a concave space 11, the lead screw 30 is rotatably received in the concave space 11. In this embodiment, two surfaces bounding the concave space 11, facing each other and essentially perpendicular to the lead screw 30, act as two stop portions 81a, 82a.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A lens module with focusing function comprising:
   a lens group being slidable along the optical axis thereof;
   a lead screw set in such a manner that the longitudinal axis thereof is parallel to the optical axis;
   a transmission member secured to the lens group, the transmission member comprising a deformable surrounding portion partially surrounding and engaging with the lead screw, the surrounding portion being engaged with the lead screw;
   an actuator for driving the lead screw to rotate to force the transmission member together with the lens group to move along the lead screw; and
   two stop portions for delimiting a movable boundary of the transmission member along the lead screw, the surrounding portion being deformable to disengage from the lead screw in the case that the surrounding portion abuts against one of the stop portions and the lead screw continues rotating.

2. The lens module as claimed in the claim 1, wherein the lens group comprises a holder secured to the transmission member and at least one pickup lens held by the holder.

3. The lens module as claimed in the claim 1, wherein the surrounding portion is engaged with the lead screw using multiple threads.

4. The lens module as claimed in the claim 1, wherein the thread angle of the lead screw is in an approximate range of 45°~60°.

5. The lens module as claimed in the claim 1, wherein the thread angle of the lead screw is about 55°.

6. The lens module as claimed in the claim 1, wherein the surrounding portion surrounds more than 120° of the circumference of the lead screw.

7. The lens module as claimed in the claim 1, wherein the surrounding portion is made of material selected from a group consisting of resilient plastic and resilient metal.

8. The lens module as claimed in the claim 1, wherein the surrounding portion is made of material selected from a group of polyoxymethylene and elastic steel.

9. The lens module as claimed in the claim 1, wherein the actuator is selected from a group of servomotor and step motor.

10. The lens module as claimed in the claim 1, further comprising a lens barrel for receiving the lens group, the lead screw, the transmission member, the actuator, and the two stop portions, a slidable member and a guide, wherein the slidable member is secured to the lens group, the guide is fixed with respect to the lens barrel configured for guiding the slidable member and the lens group sliding along the optical axis.

11. The lens module as claimed in the claim 10, wherein the slidable member defines a through hole therein, the guide is a guiding rod, the guiding rod being set parallel to the optical axis and matingly inserting through the through hole, the slidable member being slidable along the guiding rod.

12. The lens module as claimed in the claim 1, wherein the stop portions are nuts fixed to the lead screw.

13. The lens module as claimed in the claim 10, wherein the lens barrel defines a guiding groove in the inner surface thereof, the guiding groove extending in a direction essentially parallel to the optical axis, the slidable member being fittingly and slidably inserted in the guiding groove.

14. The lens module as claimed in the claim 10, wherein the lens barrel defines a concave space, the lead screw being rotatably received in the concave space, two bounding surfaces of the concave space acting as the two stop portions, the two bounding surfaces of the concave space facing each other and being essentially perpendicular to the lead screw.

15. A lens module with focusing function comprising:
a lens group being slidable along the optical axis thereof;
a lead screw set in such a manner that the longitudinal direction thereof is parallel to the optical axis;
a transmission member secured to the lens group, the transmission member comprising a deformable screw-engaging portion disengageably engaged with the lead screw;
an actuator for driving the lead screw to rotate to force the transmission member to move along the lead screw; and
two stop portions for delimiting a movable boundary of the transmission member along the lead screw, the screw-engaging portion being disengaged from the lead screw in the case that the surrounding portion abuts against one of the stop portions and the lead screw continues rotating.

16. The lens module as claimed in the claim 15, wherein the screw-engaging portion discontinuously surrounds the lead screw.

17. The lens module as claimed in the claim 16, wherein the screw-engaging portion is made of resilient material select from a group of polyoxymethylene and elastic steel.

18. The lens module as claimed in the claim 15, further comprising a lens barrel for receiving the lens group, the lead screw, the transmission member, the actuator, and the two stop portions, a slidable member and a guide, the slidable member being secured to the lens group, the guide is fixed with respect to the lens barrel configured for guiding the slidable member and the lens group sliding along the optical axis.

19. A lens module with focusing function comprising:
a lens group;
a lead screw set in such a manner that a longitudinal direction of the lead screw is essentially parallel to the optical axis of the lens group;
a transmission nut defining a longitudinal gap therein to cause the nut discontinuous in the circumferential direction thereof, the transmission nut being meshed with the lead screw except the gap, and fixed with respect to the lens group;
an actuator configured for driving the lead screw to rotate which results in the transmission member together with the lens group sliding along the longitudinal direction of the lead screw;
a slidable member secured to the lens group;
a guide for guiding the slidable member and the lens group when sliding along the optical axis, the actuator, the slidable member, and the guide cooperating to keep the transmission member and the lens group moving along the optical axis without rotation about the lead screw; and
two stop portions for delimiting a movable boundary of the transmission member along the lead screw, the transmission nut being disengaged from the lead screw, which results in the lead screw stopping driving the transmission nut, in the case that the surrounding portion abuts against one of the stop portions and the lead screw continues rotating.

20. The lens module as claimed in the claim 19, wherein the transmission nut is disengaged from the lead screw in the case of over rotating of the lead screw.

\* \* \* \* \*